Figure 1:
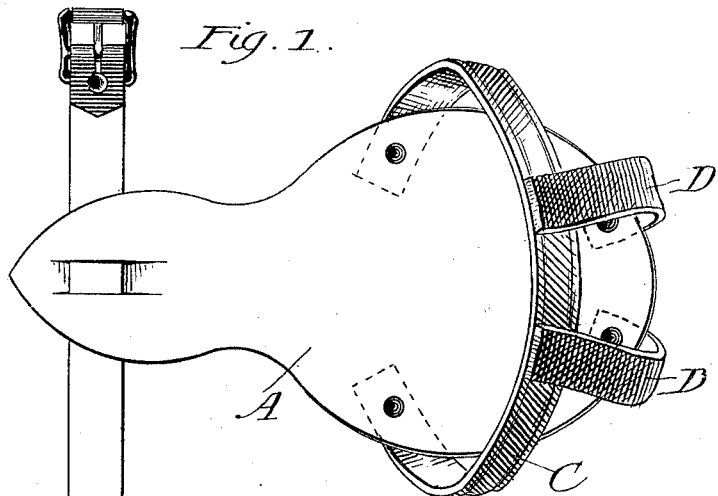
Figure 2:
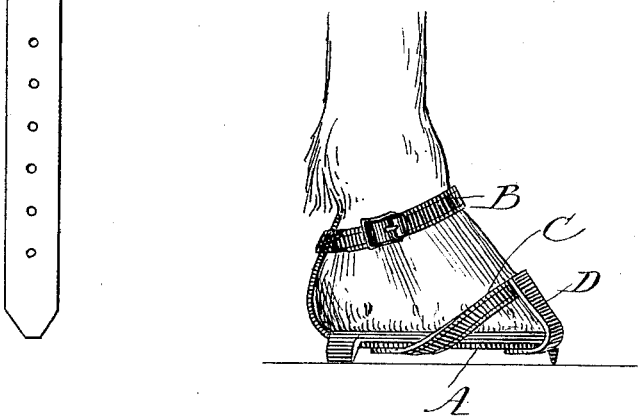
Figure 3:
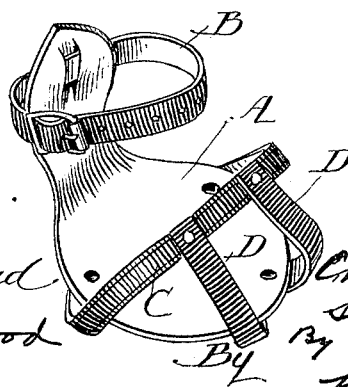

No. 626,313. Patented June 6, 1899.
C. A. STUART.
DEVICE FOR TREATING FEET OF HORSES.
(Application filed Oct. 11, 1897.)
(No Model.)

Witnesses:
Frank S. Blanchard
A. W. Brickwood

Inventor:
Charles Agustine Stuart
By A. W. Brickwood
his Attorney.

THE NORRIS PETERS CO., PHOTO-LITHO., WASHINGTON, D. C.

UNITED STATES PATENT OFFICE.

CHARLES AGUSTINE STUART, OF CHICAGO, ILLINOIS.

DEVICE FOR TREATING FEET OF HORSES.

SPECIFICATION forming part of Letters Patent No. 626,313, dated June 6, 1899.

Application filed October 11, 1897. Serial No. 654,840. (No model.)

*To all whom it may concern:*

Be it known that I, CHARLES AGUSTINE STUART, a citizen of the United States, residing at No. 75 Loomis street, in the city of Chicago, county of Cook, and State of Illinois, have invented a certain new and useful Improved Device for the Treatment of the Feet of Horses, and which I have designated for convenience in description as "soaking-pad;" and I do hereby declare the following to be a clear and exact description of the invention, such as will enable others skilled in the art to make and use the same.

My invention relates to a device for the treatment of the feet of horses; and it consists in the construction and arrangement of the parts of the same, as will be fully hereinafter disclosed in the description, drawings, and claims.

The various diseases of the hoofs of horses and the tendons attached thereto are treated most successfully by applications applied to the sole or frog of the foot, and its healthful condition is maintained by the application of moisture, preferably water, to that part of the foot. Various designs of what are commonly termed "soaking-boots" have been used for this purpose, those most generally in use being a boot made of leather that incloses the entire hoof and buckles around the fetlock of the horse. To all now in use great objections are found, as they are cumbersome, expensive, and irritate the coronet of the hoof where they are fastened. They do not keep the application in the position desired. The foot being tightly inclosed in the "boot," steam and vapor arise, causing the outside of the hoof to bleach, flake, and scale, so that any observer can detect the fact that the foot has been under treatment. They also tend to produce and irritate "shoe-boils," owing to their necessarily cumbersome construction, and the fact that the calks of the shoe rest on the leather they are not durable and after being used for a few times become practically worthless. All such objections are for all practicable purposes wholly overcome or removed by the use of my invention and discovery, as below described, and illustrated by accompanying drawings.

Figure I represents a complete soaking-pad, showing the manner in which it is made with accompanying supporting-straps. Fig. II is a pad in use as attached to the horse's foot. Fig. III represents the position of the pad and attachments when in use.

In said drawings, A represents the sole or pad and is intended to hold a saturated sponge or other material in the hoof.

C D D are the straps on the front of the hoof, forming a noose, and B the strap which surrounds the fetlock above the hoof and which holds the pad in place.

The method of making my said new and improved soaking-pad and article of manufacture is as follows, to wit: I provide a strip of heavy leather or other material, about ten (10) inches in length and about five (5) inches wide at one end and two (2) inches wide at the other, shaped as at A in Fig. I of the drawings. To the wide or front part I attach, by riveting or sewing, straps of leather about one (1) inch in width, as at C D D in drawings. At the smaller end I attach, by a cut loop or other means, a strap B, as in drawings, of sufficient length to buckle the same around the fetlock, where it will, without irritation to the horse, hold the pad firmly in place.

My new and improved soaking-pad can be easily and quickly attached by any one, as it is only necessary to lift the foot of the horse and apply the saturated sponge or other medicated treatment on the sole or frog of the foot, then slip the noose of the pad over the toe, and buckle the strap around the fetlock, as shown by Fig. II of the drawings, which illustrates the pad in actual use and which holds the treatment securely in place. The pad part of my device is made of various sizes to fit the shoe, the narrow part passing out between the calks. This allows the weight of the horse to rest entirely upon the shoe, as shown in the drawings.

Among the great advantages of my invention are the saving of wear upon the pad, owing to the fact that the calks do not come in contact with the pad. The horse can be exercised while this pad is in use without any inconvenience to the horse or injury to the pad, and I am not aware of any so-called "soaking-boot" which permits of the horse being exercised when it is in use or any pad that can be attached or removed at pleasure by the driver or stableman. By reason of its cheapness, simplicity, and ease of attachment it can be used generally in keeping the hoofs of horses moist by the frequent application of a sponge saturated with water, while it gives an unexcelled method of treating corns and contracted feet so common to the feet of horses in cities. The use of my invention tends to relieve rather than to produce or irritate shoe-boils.

As to the material used, I have found the best results from the use of belting-leather because of its pliability, resistance of moisture, and retaining its proper shape. It is manifest that other material may be used—as, for instance, rubber—following the same and general design of construction.

What I claim as new, and desire to secure by Letters Patent, is—

1. The hoof-pad for horses' hoofs, consisting in a flexible bottom piece provided with a flexible rear extension or heel-piece adapted to be bent up over the heel of the horse's foot; an open noose secured to said bottom piece to embrace the front of the hoof, and a heel-strap secured to said rear extension or bent piece to surround the fetlock, substantially as described.

2. A device for the treatment of the feet of horses, consisting of a pad formed of a single piece of flexible material, of pear-shaped formation, the larger end adapted to cover the sole or bottom of the horse's foot, it also being provided with an open noose to surround the front of the hoof, the smaller end extending so as to embrace the heel and being attached by a single strap around the fetlock, as and for the purposes described.

3. A device for the treatment of horses' feet, consisting of a pear-shaped pad to be made of belting-leather or other flexible and durable material, the larger end made to cover the bottom or sole of the foot and provided with an open noose, designed to go over the hoof for the purpose of keeping the device in place, the smaller end of the pad being designed to be used as a flap to be bent upward against the heel and provided with a strap and buckle, which fasten the device around the fetlock, as and for the purposes described.

CHARLES AGUSTINE STUART.

Witnesses:
  A. W. BRICKWOOD,
  HARRIET A. HOBART.